(12) United States Patent
Khvyiuzov (10) Patent No.: US 10,801,468 B2
(45) Date of Patent: Oct. 13, 2020

(54) PITCH BEARING, BLADE, IMPELLER OF WIND TURBINE AND CONNECTING METHOD FOR WIND TURBINE

(71) Applicant: BEIJING GOLDWIND SCIENCE & CREATION WINDPOWER EQUIPMENT CO., LTD., Beijing (CN)

(72) Inventor: Arsenii Khvyiuzov, Beijing (CN)

(73) Assignee: BEIJING GOLDWING SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 102 days.

(21) Appl. No.: 15/768,944

(22) PCT Filed: Jul. 26, 2017

(86) PCT No.: PCT/CN2017/094450
§ 371 (c)(1),
(2) Date: Apr. 17, 2018

(87) PCT Pub. No.: WO2018/120815
PCT Pub. Date: Jul. 5, 2018

(65) Prior Publication Data
US 2019/0055919 A1    Feb. 21, 2019

(51) Int. Cl.
*F03D 1/06* (2006.01)
*F03D 80/70* (2016.01)
(Continued)

(52) U.S. Cl.
CPC ......... *F03D 1/0658* (2013.01); *F03D 1/0675* (2013.01); *F03D 80/70* (2016.05);
(Continued)

(58) Field of Classification Search
CPC ...... F03D 1/0658; F03D 1/0675; F03D 80/70; F16C 2360/31
See application file for complete search history.

(56) References Cited

U.S. PATENT DOCUMENTS 2,107,690 A * 2/1938 Clark ............... F03D 3/068
416/32
4,236,873 A    12/1980 Sherman et al.
(Continued)

FOREIGN PATENT DOCUMENTS

CN    101526106 A    9/2009
CN    102575635 A    7/2012
(Continued)

OTHER PUBLICATIONS

First Australian Office Action dated Mar. 29, 2019; Appln. No. 2017359582.
(Continued)

*Primary Examiner* — Kenneth J Hansen
*Assistant Examiner* — Behnoush Haghighian (57) ABSTRACT

The invention relates to a pitch bearing, a blade, an impeller of a wind turbine and to a connecting method for the wind turbine. There is provided a pitch bearing of a wind turbine comprising: an inner bearing ring, an outer bearing ring and an extension portion, wherein one of the inner bearing ring and the outer bearing ring is connected to the extension portion. With the pitch bearing, blade, impeller of the wind turbine and the connecting method for the wind turbine according to the disclosure, it is possible to connect the blade to the pitch bearing without bolts, allow a lower weight for the wind turbine, increase strength and fatigue life of the wind turbine, and allow a lower manufacturing cost and difficulty for the wind turbine.

13 Claims, 7 Drawing Sheets

(51) Int. Cl.
*F16C 19/18* (2006.01)
*F03D 13/10* (2016.01)

(52) U.S. Cl.
CPC ............ *F16C 19/184* (2013.01); *F03D 13/10* (2016.05); *F05B 2240/221* (2013.01); *F05B 2240/302* (2013.01); *F05B 2240/50* (2013.01); *F05B 2260/301* (2013.01); *F05B 2260/79* (2013.01); *F16C 2360/31* (2013.01); *Y02E 10/721* (2013.01); *Y02P 70/523* (2015.11)

(56) References Cited

U.S. PATENT DOCUMENTS

| | | | |
|---|---|---|---|
| 4,915,590 A | 4/1990 | Eckland et al. | |
| 5,660,527 A | 8/1997 | Deering et al. | |
| 7,357,726 B2* | 4/2008 | Thorning | B29C 70/525 |
| | | | 470/14 |
| 7,993,103 B2* | 8/2011 | Cairo | F03D 1/0658 |
| | | | 416/210 R |
| 8,177,514 B2* | 5/2012 | Hibbard | F03D 1/0675 |
| | | | 416/226 |
| 8,177,515 B2* | 5/2012 | Hibbard | F03D 1/0675 |
| | | | 416/226 |
| 8,382,440 B2* | 2/2013 | Baker | F03D 1/0675 |
| | | | 416/226 |
| 8,932,177 B2* | 1/2015 | Suzuki | F16C 17/04 |
| | | | 475/331 |
| 9,388,789 B2* | 7/2016 | Hibbard | F03D 1/0675 |
| 9,534,416 B2* | 1/2017 | Ohlen | E04H 12/34 |
| 9,638,162 B1* | 5/2017 | Fletcher | B61D 45/003 |
| 9,707,699 B2* | 7/2017 | Peixoto | F03D 13/22 |
| 10,184,262 B2* | 1/2019 | Pedersen | E04H 12/342 |
| 2007/0231146 A1* | 10/2007 | Birkemeyer | F03D 1/0658 |
| | | | 416/204 R |
| 2011/0052403 A1* | 3/2011 | Kawasetsu | F03D 1/0675 |
| | | | 416/226 |
| 2011/0158788 A1* | 6/2011 | Bech | F03D 1/0675 |
| | | | 415/1 |
| 2013/0108464 A1 | 5/2013 | McEwen et al. | |
| 2013/0209728 A1* | 8/2013 | Buechler | F03D 1/0675 |
| | | | 428/99 |
| 2014/0056709 A1 | 2/2014 | Palomas | |
| 2014/0377072 A1 | 12/2014 | Moore et al. | |
| 2015/0167641 A1 | 6/2015 | Moller | |
| 2016/0123306 A1 | 5/2016 | Minadeo et al. | |
| 2017/0037651 A1* | 2/2017 | Pedersen | E04H 12/342 |
| 2017/0122287 A1* | 5/2017 | Dobbe | B29C 65/48 |
| 2017/0138342 A1* | 5/2017 | Hoffmann | F03D 1/0658 |
| 2017/0152838 A1* | 6/2017 | Thomsen | F03D 80/50 |
| 2018/0223811 A1* | 8/2018 | Fletcher | B61D 45/003 |

FOREIGN PATENT DOCUMENTS

| | | |
|---|---|---|
| CN | 204493087 U | 7/2015 |
| CN | 105545612 A | 5/2016 |
| CN | 205225591 U | 5/2016 |
| CN | 205578190 U | 9/2016 |
| CN | 106640558 A | 5/2017 |
| EP | 1741940 A1 | 1/2007 |
| EP | 1741943 A2 | 1/2007 |
| JP | 2016-031043 A | 3/2016 |
| KR | 1020150145797 A | 12/2015 |

OTHER PUBLICATIONS

International Search Report and Written Opinion dated Oct. 27, 2017; PCT/CN2017/094450.
Extended European Search Report dated May 14, 2019; Appln. No. 17866371.2.
The First Chinese Office Action dated Aug. 31, 2018, Appln. No. 201611260566.3.

* cited by examiner

PITCH BEARING, BLADE, IMPELLER OF WIND TURBINE AND CONNECTING METHOD FOR WIND TURBINE

CROSS REFERENCE TO RELATED APPLICATIONS

This application is the national phase of International Application No. PCT/CN2017/094450, titled "PITCH BEARING, BLADE, IMPELLER OF WIND TURBINE AND CONNECTING METHOD FOR WIND TURBINE", filed on Jul. 26, 2017 which claims the benefit of priority, to Chinese patent application No. 20161126066.3 titled "PITCH BEARING, BLADE, IMPELLER OF WIND TURBINE AND CONNECTING METHOD FOR WIND TURBINE", filed with the Chinese State. Intellectual Property Office on Dec. 30, 2016, the entire disclosures of which applications are incorporated herein by reference.

FIELD

The present disclosure relates to a field of wind turbine, and more particularly to a pitch bearing, a blade, an impeller of a wind turbine and to a connecting method for the wind turbine.

BACKGROUND

Through the history of wind turbine blade production, various efforts have been made to develop a robust, compact, and inexpensive connection between blade root made of composite materials and pitch bearing ring made of metal. It has been difficult to fix a blade formed of glass fiber/resin, wood fiber/resin, or carbon fiber/resin to a bearing ring formed of metal in an efficient and reliable way.

Generally, a blade root is connected to a pitch bearing ring by inevitably employing bolts, nuts and other threaded parts. For example, steel bearing rings may be coupled to a blade root of composite material via bolts installed in drilled radial holes around the perimeter thereof. It is believed that the bending load transfer mechanism in this design results principally in a pulling force at the interface between the T-bolts and the blade. Moreover, a connection with bolts inevitably has stress concentrations, and therefore, in order to preserve stresses at acceptable levels, bulky, heavy blade root and pitch bearing designs are employed.

Therefore, a device and a method capable of connecting a blade root to a pitch bearing without bolts are needed.

SUMMARY

In order to connect a blade root to a pitch bearing without bolts, an object of the present disclosure is to provide a pitch bearing, a blade, an impeller of a wind turbine and a connecting method for the wind turbine, which allow a lower weight for the wind turbine, increase strength and fatigue life of the wind turbine, and allow a lower manufacturing cost and difficulty for the wind turbine.

According to an aspect of the present disclosure, there is provided a pitch bearing of a wind turbine comprising: an inner bearing ring, an outer bearing ring and an extension portion, wherein one of the inner bearing ring and the outer bearing ring is connected to the extension portion.

According to an embodiment of the present disclosure, the pitch bearing further comprises: at least one pin, which is connected to the extension portion.

According to an embodiment of the present disclosure, the pin is integrally formed with the extension portion.

According to an embodiment of the present disclosure, the pin is connected to a radial outer side or a radial inner side of the extension portion.

According to an embodiment of the present disclosure, the extension portion comprises an outer extension portion and an inner extension portion, wherein the outer extension portion and the inner extension portion are radially spaced from each other to form a radial space.

According to an embodiment of the present disclosure, the extension portion comprises at least one first hole.

According to an embodiment of the present disclosure, the extension portion comprises at least one first hole, and the pin is connected to the extension portion through the first hole.

According to an embodiment of the present disclosure, a radial thickness of the extension portion decreases in a direction away from the said one of the inner bearing ring and the outer bearing ring.

According to an embodiment of the present disclosure, the extension portion comprises a plurality of extension portion segments that are distributed in a circumferential direction and spaced from each other.

According to an aspect of the present disclosure, there is provided a blade for a wind turbine, comprising: a blade root, comprising at least one second hole which is provided in a radial direction of the blade root.

According to an embodiment of the present disclosure, the second hole of the blade root is a through hole.

According to an embodiment of the present disclosure, the second hole of the blade root is a blind hole.

According to an embodiment of the present disclosure, the blade further comprises at least one pin which is able to be connected to the blade root through the second hole.

According to an embodiment of the present disclosure, the second hole of the blade root is structured such that the pin is able to be disposed in the second hole of the blade root with interference fit.

According to an aspect of the present disclosure, there is provided an impeller of a wind turbine, comprising: a blade, comprising a blade root, comprising at least one second hole which is provided in a radial direction of the blade root; a connection device, comprising: an extension portion; and at least one pin, wherein the pin is connected to the extension portion; and a pitch bearing, comprising an inner bearing ring and an outer bearing ring, wherein one of the inner bearing ring and the outer bearing ring is connected to the extension portion, wherein the pin is connected to the blade root through the second hole.

According to an embodiment of the present disclosure, the extension portion comprises at least one first hole, and the pin is connected to the extension portion through the first hole.

According to an embodiment of the present disclosure, the pin is integrally formed with the extension portion.

According to an embodiment of the present disclosure, the extension portion is integrally formed with the said one of the inner bearing ring and the outer bearing ring.

According to an embodiment of the present disclosure, the pin is connected to a radial outer side or a radial inner side of the extension portion.

According to an embodiment of the present disclosure, the extension portion comprises an outer extension portion and an inner extension portion, wherein the outer extension portion and the inner extension portion are radially spaced from each other to form a radial space, and wherein the blade root is disposed in the radial space between the outer extension portion and the inner extension portion.

According to an embodiment of the present disclosure, the pin is disposed in the second hole of the blade root with interference fit.

According to an embodiment of the present disclosure, the second hole of the blade root is a through hole, and the pin is disposed to penetrate through the second hole of the blade root.

According to an embodiment of the present disclosure, the second hole of the blade root is a blind hole.

According to an embodiment of the present disclosure, a radial thickness of the extension portion decreases in a direction away from the said one of the inner bearing ring and the outer bearing ring.

According to an embodiment of the present disclosure, the pin is disposed such that an extending direction of the pin is perpendicular to a pitch axis of the blade.

According to an embodiment of the present disclosure, the extension portion comprises a plurality of extension portion segments that are distributed in a circumferential direction and spaced from each other, and the pin(s) comprises a plurality of groups of pins that are distributed in the circumferential direction and spaced from each other.

According to an aspect of the present disclosure, there is provided a wind turbine comprising a pitch bearing according to the disclosure.

According to an aspect of the present disclosure, there is provided a wind turbine comprising a blade according to the disclosure.

According to an aspect of the present disclosure, there is provided a wind turbine comprising an impeller according to the disclosure.

According to an aspect of the present disclosure, there is provided a connecting method for a wind turbine, comprising: using pin(s) to connect a pitch bearing according to the disclosure to a blade according to the disclosure.

As compared with classic blade root attachment means, small diameter pins apply no or minor damage to blade root, and no stress concentration is present in blade root of composite material, thus blade root thickness and length might be reduced, which subsequently reduces an overall weight of the blade. As no bolts are employed at blade-to-pitch bearing connection, there is no need to perform bolt pre-tension, which reduces the joint load. Since pins might be arranged in pre-defined manner, gross section area of blade root with holes remains relatively large, and it is possible to carry higher load. Since load is transferred through the array of independent pins, a multi-load path design is provided which increases failure tolerance of blade-to-pitch bearing connection.

DETAILED DESCRIPTION

The embodiments of the present disclosure will be described below with reference to the accompanying drawings. The following detailed descriptions and the accompanying drawings are used for exemplarily illustrating the principle of the present disclosure, the present disclosure is not limited to the described preferred embodiments, and the scope of the present disclosure is defined by the claims.

Figure 1:
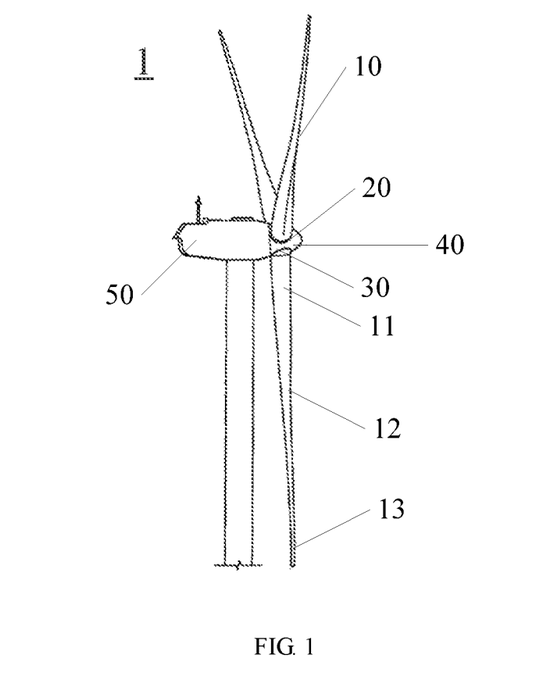
FIG. 1 is a schematic diagram of a wind turbine according to an embodiment of the present disclosure.

FIG. 1 is a schematic diagram of a wind turbine according to an embodiment of the present disclosure. As shown in FIG. 1, a wind turbine 1 comprises at least one blade 10, a pitch bearing 30 and a hub 40. The hub 40 is connected to a wind turbine nacelle 50. For simplicity, some well-known components such as gearbox, generator, etc. are not shown in FIG. 1. The blade 10 and the pitch bearing 30 (and optionally a connection device 20 according to the disclosure, which will be described below) herein can be together referred to as an impeller.

In an exemplary embodiment, the wind turbine 1 comprises plural blades 10, for example three blades 10. In this case, the wind turbine 1 can comprise a same number of the connection devices 20 and a same number of the pitch bearings 30 with the blades 10. Each blade 10 is connected to the pitch bearing 30 via the connection device 20, wherein the pitch bearing 30 is connected to the hub 40.

As shown in FIG. 1, the blade 10 comprises a blade root 11, a blade main body 12 and a blade tip 13. In an exemplary embodiment, the blade root 11 is at least partially formed of composite material, for example fiber reinforced composite material.

Figure 2:
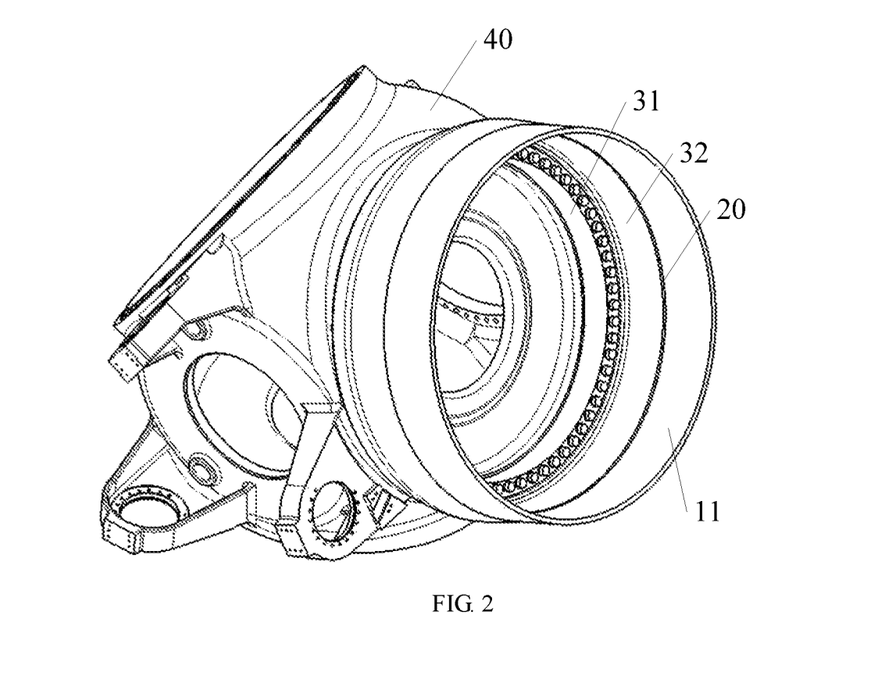
FIG. 2 is a partial schematic diagram of a wind turbine according to an embodiment of the present disclosure, showing a connection construction of a blade, a connection device and a pitch bearing.

FIG. 2 is a partial schematic diagram of a wind turbine according to an embodiment of the present disclosure, showing a connection construction of the blade 10, the connection device 20 and the pitch bearing 30. In an exemplary embodiment, the pitch bearing 30 is a rolling element bearing, such as a ball bearing. In some embodiments, the pitch bearing 30 is a double row ball bearing, such as a double-row angular contact ball bearing. As shown in FIG. 2, the pitch bearing 30 comprises an inner bearing ring 31 and an outer bearing ring 32 (refer to FIG. 3).

In an exemplary embodiment, the inner bearing ring 31 and/or the outer bearing ring 32 of the pitch bearing 30 are formed of homogeneous material, including metal material, such as steel. In some embodiments, at least a part of the pitch bearing 30 comprises an anti-corrosion coating.

As shown in FIG. 2, the blade root 11 of the blade 10 is connected to the outer bearing ring 32 of the pitch bearing 30. The inner bearing ring 31 of the pitch bearing 30 is connected to the hub 40. For example, the inner bearing ring 31 is connected to the hub 40 via bolts.

Figure 3:
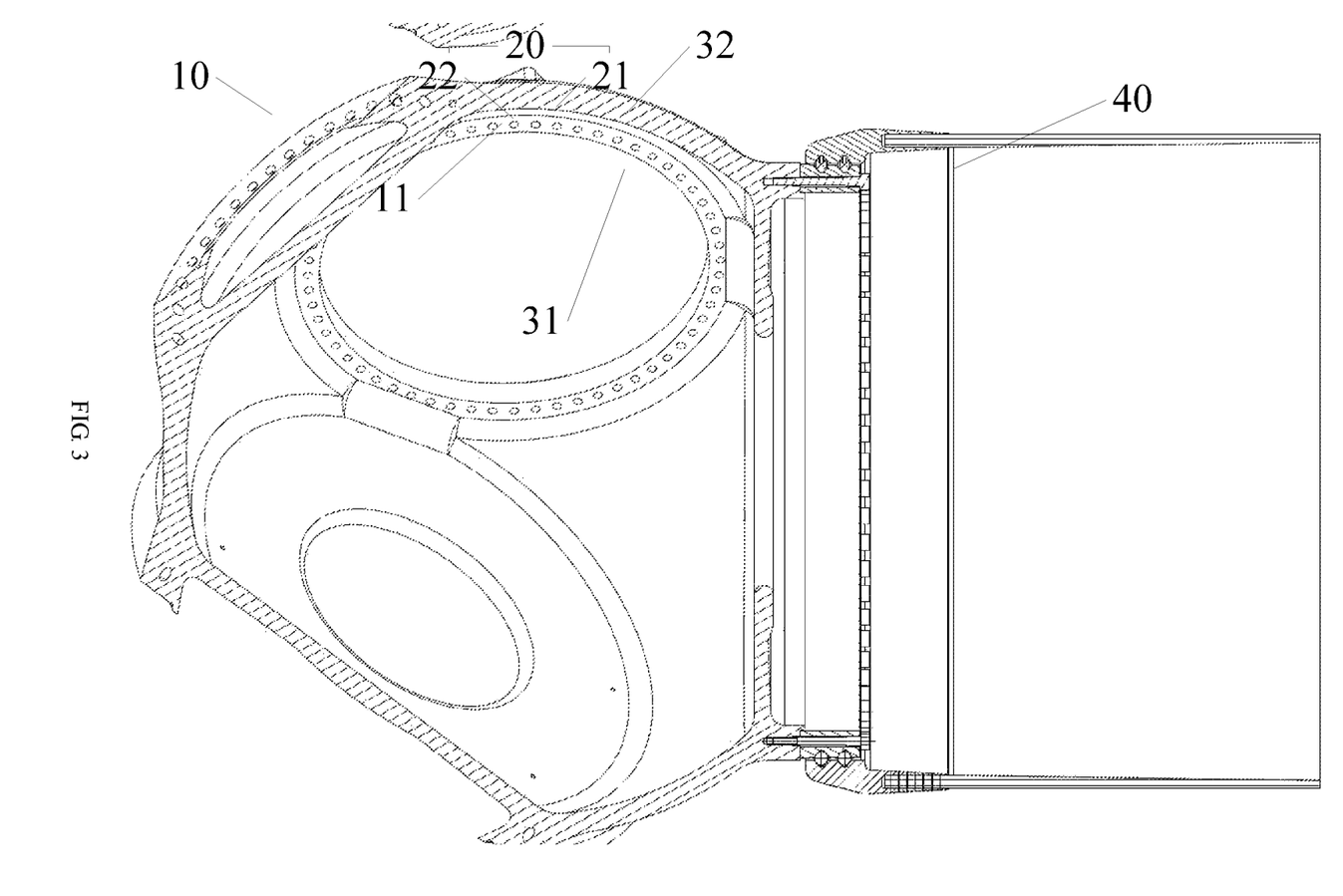
FIG. 3 is a partial section view of a wind turbine according to an embodiment of the present disclosure, showing a connection construction of a blade, a connection device and a pitch bearing.

FIG. 3 is a partial section view of a wind turbine according to an embodiment of the present disclosure, showing a connection construction of the blade 10, the connection device 20 and the pitch bearing 30. As shown in FIG. 3, the blade root 11 of the blade 10 is connected to the outer bearing ring 32 of the pitch bearing 30 through the connection device 20.

The blade root as described above is connected to the outer bearing ring of the pitch bearing via the connection device according to the present disclosure. However, the present disclosure is not limited to this. It will be appreciated by any person skilled in the art that the blade root according to the present disclosure can also be connected to the inner bearing ring of the pitch bearing via the connection device. In this case, the outer bearing ring of the pitch bearing is connected to the hub via, for example, bolts.

Figure 4:
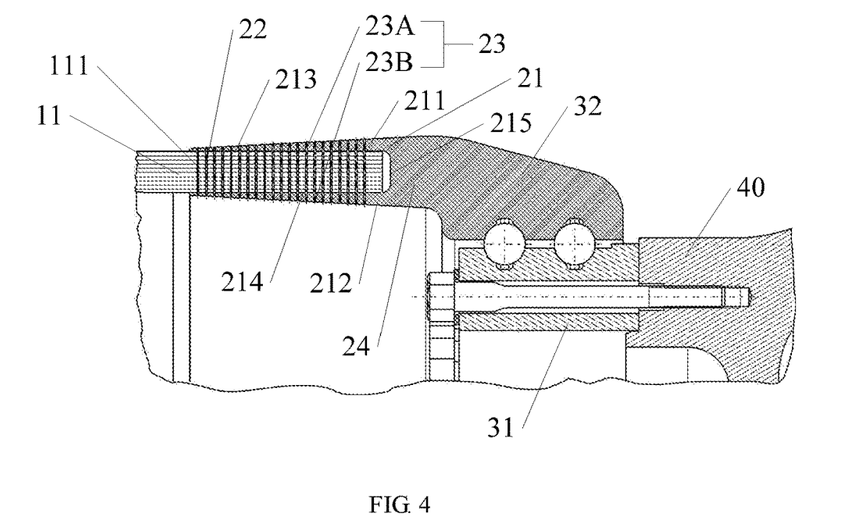
FIG. 4 is a partially enlarged section view of a wind turbine according to an embodiment of the present disclosure, showing a connection construction of a blade, a connection device and a pitch bearing.

FIG. 4 is a partially enlarged section view of a wind turbine according to an embodiment of the present disclosure, showing a connection construction of the blade 10, the connection device 20 and the pitch bearing 30. As shown in FIG. 4, the connection device 20 comprises an extension portion 21 and at least one pin 22. In an exemplary embodiment, the connection device 20 comprises a plurality of pins 22.

In some embodiments, at least a part of the connection device 20 has been treated with fatigue life increasing treatment to improve its fatigue life. In some embodiments, at least a part of the connection device 20 comprises an anti-corrosion coating. In some embodiments, the connection device 20 can further comprise a lightning protection unit to avoid or reduce damage due to lightning.

According to embodiments of the present disclosure, the extension portion 21 is configured to connect to the pitch bearing 30, for example the inner bearing ring 31 or the outer bearing ring 32 of the pitch bearing 30. In an exemplary embodiment, the extension portion 21 is integrally formed with the inner bearing ring 31 or the outer bearing ring 32 of the pitch bearing 30. In some embodiments, the extension portion 21 and the inner bearing ring 31 or the outer bearing ring 32 of the pitch bearing 30 are formed of identical material, including homogeneous material, such as steel.

According to some embodiments of the disclosure, the extension portion 21 is structured to connect to the blade 10, such as the blade root 11 of the blade 10, via pin(s) 22.

According to some embodiments of the disclosure, the extension portion 21 and the pin 22 are connected firmly with each other. In some embodiments, the extension portion 21 and the pin 22 can be separately formed and then connected to each other. According to some embodiments of the disclosure, the extension portion 21 in turn comprises first hole(s) 23 such that the pin 22 can be connected to the extension portion 21 through the first hole(s) 23. In an exemplary embodiment, the first hole 23 of the extension portion 21 has a shape corresponding to the shape of the pin 22.

According to some embodiments of the disclosure, the first hole 23 of the extension portion 21 is a through hole.

According to some embodiments of the disclosure, the number, shape and position of the first holes 23 can be appropriately selected such that the extension portion 21 has a sufficient net section and is able to transfer load from the blade root to the extension portion via the pins 22.

In the embodiment shown in FIG. 4, the extension portion 21 comprises an outer extension portion 211 and an inner extension portion 212, wherein the outer extension portion 211 and the inner extension portion 212 are spaced from each other in a radial direction. In the disclosure, the term "radial direction" refers to a direction perpendicular to a pitch axis of the blade 10 when the blade 10 is connected to the connection device 20. The blade root 11 comprises an engagement portion, at which the blade root 11 engages with the extension portion 21 (for example, the outer extension portion 211 and/or the inner extension portion 212). The outer extension portion 211 and the inner extension portion 212 are structured such that the engagement portion of the blade root 11 can be disposed in the radial space between the outer extension portion 211 and the inner extension portion 212.

According to some embodiments of the disclosure, the extension portion 21 (for example the outer extension portion 211) can have a varying thickness. In the disclosure, the term "the thickness of the extension portion" refers to a dimension of the extension portion in the radial direction. In an exemplary embodiment, the thickness of the extension portion 21 can decrease in a spanwise direction of the blade 10 when the blade 10 is connected with the connection device. In this case, the extension portion 21 has a wedged shape in its cross section.

In an exemplary embodiment, as shown in FIG. 4, the thickness of the outer extension portion 211 can decrease in a spanwise direction of the blade 10, and the thickness of the inner extension portion 212 can decrease in a spanwise direction of the blade 10, when the blade 10 is connected with the connection device.

In an exemplary embodiment, the engagement portion of the blade root 11 has a uniform thickness. In the disclosure, the term "thickness of the engagement portion" refers to a dimension of the engagement portion in the radial direction.

According to some embodiments of the disclosure, the outer extension portion 211 comprises an inner surface 213 facing the inner extension portion 212, and the inner extension portion 212 comprises an inner surface 214 facing the outer extension portion 211. According to some embodiments of the disclosure, the extension portion 21 further comprises an inner surface 215 adjoining the inner surface 213 and the inner surface 214. In an exemplary embodiment, the inner surface 213 of the outer extension portion 211 and the inner surface 214 of the inner extension portion 212 are parallel to each other. In an exemplary embodiment, the inner surface 213 and the inner surface 215 are perpendicular to each other, and/or the inner surface 214 and the inner surface 215 are perpendicular to each other.

In an exemplary embodiment, the connection device 20 is structured such that when the blade root 11 (engagement portion) is disposed in the radial space between the outer extension portion 211 and the inner extension portion 212, the blade root 11 contacts with the inner surface 213 and the inner surface 214. In some embodiments, the connection device 20 is structured such that when the blade root 11 is disposed in the radial space between the outer extension portion 211 and the inner extension portion 212, the blade root 11 contacts the inner surface 213, the inner surface 214 and the inner surface 215.

As shown in FIG. 4, the outer extension portion 211 comprises at least one first hole 23A, and the inner extension portion 212 comprises at least one first hole 23B. In an exemplary embodiment, the number of the first hole(s) 23A of the outer extension portion 211 is equal to the number of the first hole(s) 23B of the inner extension portion 212. In some embodiments, the number of the first hole(s) 23A of the outer extension portion 211 is larger or smaller than the number of the first hole(s) 23B of the inner extension portion 212. In an exemplary embodiment, there is a one-to-one correspondence between positions of the first holes 23A of the outer extension portion 211 and positions of the first holes 23B of the inner extension portion 212. In some embodiments, there is a one-to-one correspondence between positions of at least a part of the first holes 23A of the outer extension portion 211 and positions of at least a part of the first holes 23B of the inner extension portion 212.

According to some embodiments of the disclosure, as shown in FIG. 4, the blade root 11 comprises at least one second hole 111 for accommodating the pin 22. In an exemplary embodiment, the blade root 11 comprises a plurality of second holes 111.

In an exemplary embodiment, the number of the second holes 111 of the blade root 11 is equal to the number of the first holes 23 of the extension portion 21 (for example, the number of the first holes 23A of the outer extension portion 211 and the number of the first holes 23B of the inner extension portion 212).

According to some embodiments of the disclosure, the second hole 111 of the blade root 11 is a through hole. According to some embodiments of the disclosure, the number, shape and position of the second holes 111 of the blade root 11 can be appropriately selected such that the blade root 11 has a sufficient net section and is able to transfer load from the blade root to the extension portion via the pins 22.

According to some embodiments of the disclosure, the pin 22 can be disposed in the second hole 111 of the blade root 11 such that the blade root 11 is fixedly connected to the connection device 20 and then to the pitch bearing 30 (for example the inner bearing ring 31 or the outer bearing ring 32). In an exemplary embodiment, as shown in FIG. 4, the pin 22 can insert in and penetrate through the first hole 23 of the extension portion 21 (for example, the first hole 23A of the outer extension portion 211 and/or the first hole 23B of the inner extension portion 212) and the second hole 111 of the blade root 11, such that the blade root 11 is fixedly connected to the extension portion 21.

In an exemplary embodiment, the pin 22 can be disposed in the second hole 111 of the blade root 11 with interference fit. However, the present disclosure is not limited to this. In some embodiments, when the pin 22 is being disposed in the second hole 111, adhesives such as resin can be applied between the pin 22 and the second hole 111. In some embodiments, when the pin 22 is disposed in the second hole 111, the pin 22 can be fixed in the second hole 111 by for example welding, clinching and the like.

According to some embodiments of the disclosure, the pins 22 can be regularly arranged in the second holes 111 of the blade root 11. In an exemplary embodiment, the pins 22 can be arranged in an m×n array, wherein both m and n are natural numbers. However, the present disclosure is not limited to this. According to some embodiments of the disclosure, the pins 22 can be arranged in other regular form or irregularly arranged so long as the arranged pins 22 can appropriately connect the blade root 11 to the pitch bearing 30.

According to some embodiments of the disclosure, the pin 22 can extend in the radial direction to be disposed in the second hole 111 of the blade root 11. In an exemplary embodiment, the pin 22 can extend in the radial direction and thus penetrate through the first hole 23 of the extension portion 21 and the second hole 111 of the blade root 11. However, the present disclosure is not limited to this. In some embodiments, the pin 22 can be disposed in the second hole 111 of the blade root 11 obliquely with respect to the radial direction.

According to some embodiments of the disclosure, the pin 22 can be disposed in the second hole 111 of the blade root 11 in a direction perpendicular to the pitch axis of the blade 10. If the blade 10 is formed of fiber reinforced composite material, the extending direction of the pin 22 perpendicular to the pitch axis of the blade 10 can reduce damage to the fiber in the blade 10 from the pin 22, thereby maintaining the strength of the blade 10 and reducing the amount of material for the blade 10. However, the present disclosure is not limited to this. According to some embodiments of the disclosure, the pin 22 can be disposed in the second hole 111 of the blade root 11 at other degree angle with respect to the pitch axis of the blade 10.

According to some embodiments of the disclosure, the pin 22 can have a shape of body of revolution, including cylinder, cone, truncated cone or other shapes of body of revolution obtained by other curves, such as a shape of spike and the like. According to some embodiments of the disclosure, the pin 22 can have a shape other than shape of body of revolution, such as cuboid, pyramid, cylinder or cone with slot, cylinder or cone with key, or other appropriate shapes.

According to some embodiments of the disclosure, the plural pins 22 can be formed of identical or different materials. In some embodiments, the pins 22 can have same shapes. In some embodiments, the pins 22 can have different shapes. For example, as shown in FIG. 4, the pins 22 have different lengths. According to the disclosure, it will be appreciated by any person skilled in the art that the pins 22 can have different shapes in terms of other parameters, such as cross-section area, diameter, position of slot, length of slot, position of key, length of key and the like.

According to some embodiments of the disclosure, if the blade root 11 is formed of the fiber reinforced composite material, the pin 22 can be sized to correspond to the cross section of fiber bundles in the fiber reinforced composite material. In this case, the pin 22 can be appropriately inserted between fiber bundles in the blade root 11 so as to avoid or reduce damage to the fiber bundles and thus maintain strength of the blade root 11. For example, the pin 22 may has a diameter of 1 to 3 mm.

As shown in FIG. 4, the connection device 20 can further comprise a transition portion 24, through which the extension portion 21 is connected to the inner bearing ring 31 or the outer bearing ring 32 of the pitch bearing 30. In an exemplary embodiment, the transition portion 24 has a thickness that is larger than the thickness of the extension portion 21 (for example the thickness of the outer extension portion 211 or the inner extension portion 212). The transition portion 24 can provide a smooth transition from the extension portion 21 to the inner bearing ring 31 or the outer bearing ring 32, such that during the operation of the wind turbine, load can be smoothly transferred from the extension portion 21 to the pitch bearing 30. Therefore, the transition portion 24 can reduce stress concentration in the connection device 20 of the wind turbine 1, subsequently increasing fatigue life of the connection device 20.

The inner surface 213 of the outer extension portion 211 and the inner surface 214 of the inner surface 214 as described above are parallel to each other. However, the present disclosure is not limited to this. According to some embodiments of the disclosure, the inner surface 213 and the inner surface 214 can be arranged in a non-parallel way.

The engagement portion of the blade root 11 as described above has a uniform thickness. However, the present disclosure is not limited to this. According to some embodiments of the disclosure, the engagement portion of the blade root 11 may have a varying thickness. In some embodiments, the thickness of the engagement portion of the blade root 11 can increase or decrease in a direction towards the blade tip 13, for example gradually or intermittently increasing or decreasing. In this case, the varying thickness of the engagement portion of the blade root 11 can facilitate a better transfer of load from the blade to the pitch bearing.

As described above, the extension portion 21 and the inner bearing ring 31 or the outer hearing ring 32 of the pitch bearing 30 are integrally formed. However, the present disclosure is not limited to this. It will be appreciated by any person skilled in the art that the extension portion 21 and the inner bearing ring 31 or the outer bearing ring 32 of the pitch bearing 30 can be separately formed and then connected to each other. In some embodiments, the extension portion 21 and the inner bearing ring 31 or the outer bearing ring 32 of the pitch bearing 30 can be connected by for example welding and the like.

As described above, the pin 22 penetrates through the first hole 23A of the outer extension portion 211 and the first hole 23B of the inner extension portion 212. However, the present disclosure is not limited to this. In some embodiments, the pin 22 does not penetrate through the first hole 23A of the outer extension portion 211 or the first hole 23B of the inner extension portion 212. For example, the first hole 23A of the outer extension portion 211 or the first hole 23B of the inner extension portion 212 may be a blind hole.

As described above, the pin 22 penetrates through the second hole 111 of the blade root 11. However, the present disclosure is not limited to this. According to some embodiments of the disclosure, the pin 22 does not penetrate through the second hole 111 of the blade root 11. For example, the second hole 111 of the blade root 11 may be a blind hole, or the pin 22 may be disposed along a limited length of the second hole 111.

As described above, there is a one-to-one correspondence between the positions of at least a part of the first holes 23A of the outer extension portion 211 and the positions of at least a part of the first holes 23B of the inner extension portion 212. However, the present disclosure is not limited to this. According to some embodiments of the disclosure, the first holes 23A of the outer extension portion 211 and the first holes 23B of the inner extension portion 212 may be arranged in a staggered pattern.

Figure 5:
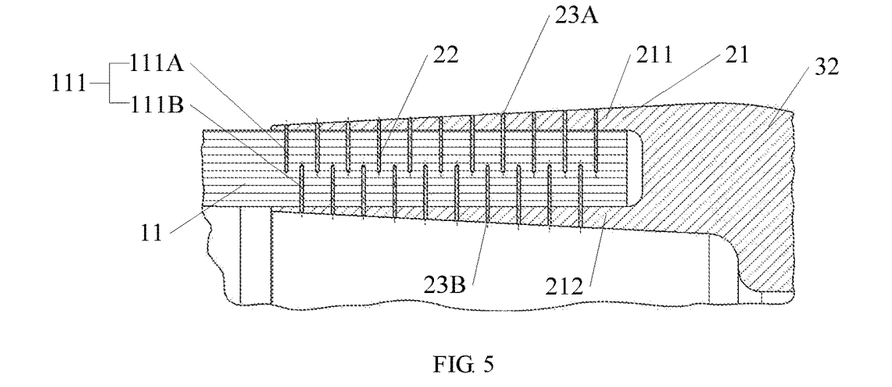
FIG. 5 is a partially enlarged section view of a wind turbine according to another embodiment of the present disclosure, showing a connection construction of a blade, a connection device and a pitch bearing.

FIG. 5 is a partially enlarged section view of a wind turbine according to another embodiment of the present disclosure, showing a connection construction of the blade 10, the connection device 20 and the pitch bearing 30.

As shown in FIG. 5, the blade root 11 comprises second holes 111, wherein at least a part of the second holes 111 are blind holes. In an exemplary embodiment, the blade root 11 comprises upper second hole(s) 111A and lower second hole(s) 111B, wherein the upper second hole(s) 111A and the lower second hole(s) 111B are arranged in a staggered pattern.

According to some embodiments of the disclosure, the outer extension portion 211 comprises at least one first hole 23A, and the inner extension portion 212 comprises at least one first hole 23B.

According to some embodiments of the disclosure, the pins 22 can be disposed in the upper second hole(s) 111A and lower second hole(s) 111B of the blade root 11 such that the blade root 11 is fixedly connected to the connection device 20 (for example the extension portion 21) and then to the pitch bearing 30 (for example the inner bearing ring 31 or the outer bearing ring 32). In an exemplary embodiment, as shown in FIG. 5, the pins 22 can be inserted in the first holes 23A of the outer extension portion 211 and the upper second holes 111A of the blade root 11, and/or the pins 22 can be inserted in the first holes 23B of the inner extension portion 212 and the lower second holes 111B of the blade root 11, such that the blade root 11 is fixedly connected to the extension portion 21.

In the embodiment as shown in FIG. 5, other structure and construction of the blade 10, the connection device 20 and the pitch bearing 30 refer to the above description, and will not be explained here.

As described above, the extension portion 21 comprises both the outer extension portion 211 and the inner extension portion 212. However, the present disclosure is not limited to this. According to some embodiments of the disclosure, the extension portion 21 may comprise one or more than two extension portions.

As described above, the pin 22 and the extension portion 21 are separately formed and then connected to each other. However, the present disclosure is not limited to this. According to some embodiments of the disclosure, the pin 22 and the extension portion 21 can be integrally formed together.

Figure 6:
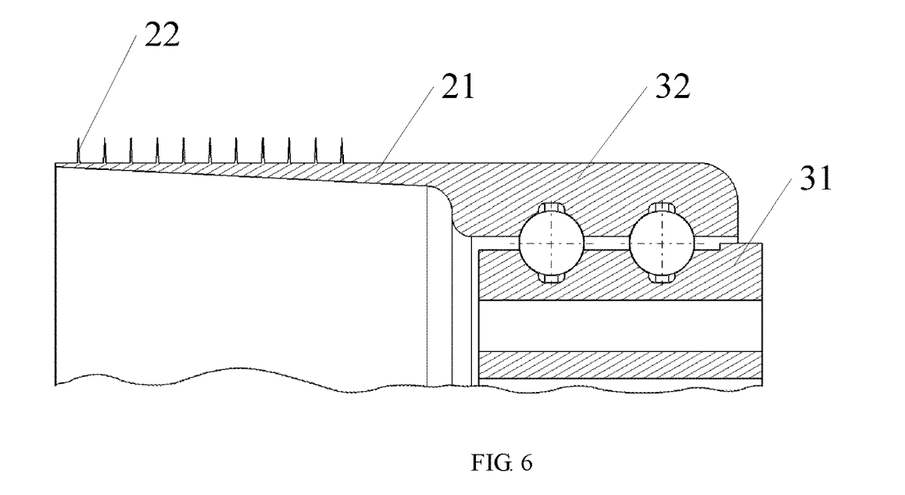
FIG. 6 is a partially enlarged section view of a wind turbine according to another embodiment of the present disclosure, showing a connection construction of a blade, a connection device and a pitch bearing.

FIG. 6 is a partially enlarged section view of a wind turbine according to an embodiment of the present disclosure, showing a connection construction of the blade 10, the connection device 20 and the pitch bearing 30.

As shown in FIG. 6, the connection device 20 comprises one extension portion 21 and at least one pin 22. In an exemplary embodiment, the connection device 20 comprises a plurality of pins 22. In an exemplary embodiment, the extension portion 21 is structured to connect to the pitch bearing 30, such as the inner bearing ring 31 or the outer bearing ring 32 of the pitch bearing 30. In an exemplary embodiment, the extension portion 21 is integrally formed with the inner bearing ring 31 or the outer bearing ring 32 of the pitch bearing 30.

In an exemplary embodiment, the extension portion 21 and the pin 22 are integrally formed together. As shown in FIG. 6, the pin 22 is disposed on a radial outer side of the extension portion 21. Particularly, the pin 22 extends outwardly from a radial outer surface of the extension portion 21. In an exemplary embodiment, the radial outer surface of the extension portion 21 is a planar surface. In some embodiments, the radial outer surface of the extension portion 21 is a curved surface.

According to some embodiments of the disclosure, the pin 22 can be disposed in the second hole 111 of the blade root 11 such that the blade root 11 is fixedly connected to the extension portion 21 of the connection device 20 and then to the pitch bearing 30 (for example the inner bearing ring 31 or the outer bearing ring 32). In an exemplary embodiment, as shown in FIG. 6, the pins 22 on the extension portion 21 can be inserted in the second holes 111 of the blade root 11 such that the blade root 11 is fixedly connected to the extension portion 21. In some embodiments, the pin 22 penetrates through the second hole 111 of the blade root 11. In some embodiments, the pin 22 does not penetrate through the second hole 111 of the blade root 11.

In some embodiments, the pin 22 and the extension portion 21 are formed of identical material, including homogeneous material, such as steel.

In the embodiment as shown in FIG. 6, other structure and construction of the blade 10, the connection device 20 and the pitch bearing 30 refer to the above description, and will not be explained here.

Figure 7:
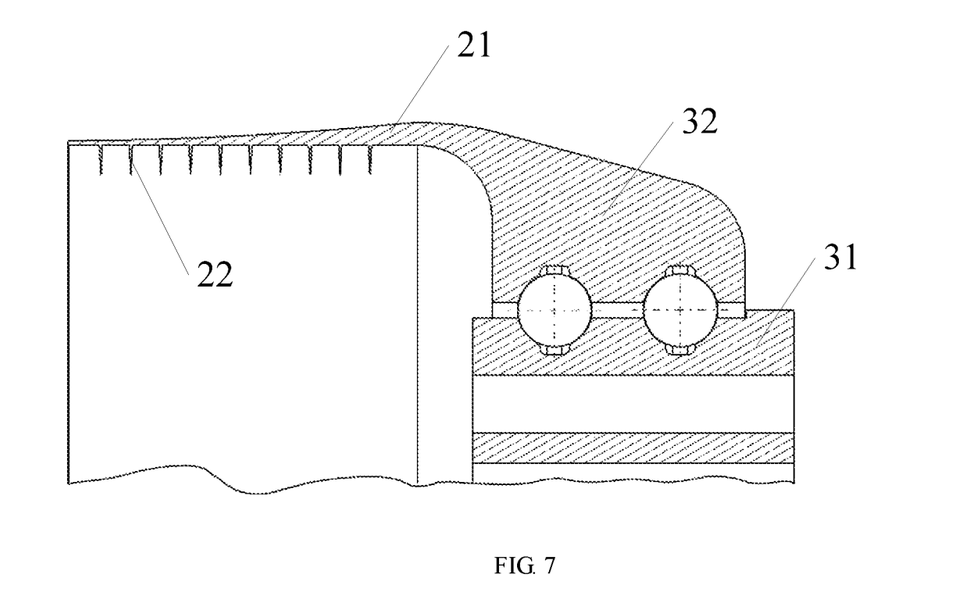
FIG. 7 is a partially enlarged section view of a wind turbine according to another embodiment of the present disclosure, showing a connection construction of a blade, a connection device and a pitch bearing.

FIG. 7 is a partially enlarged section view of a wind turbine according to an embodiment of the present disclosure, showing a connection construction of the blade 10, the connection device 20 and the pitch bearing 30.

FIG. 7 shows, as compared with the embodiment shown in FIG. 6, the pin 22 is disposed on a radial inner side of the extension portion 21. Particularly, the pin 22 extends inwardly from a radial inner surface of the extension portion 21. In an exemplary embodiment, the radial inner surface of the extension portion 21 is a planar surface. In some embodiments, the radial inner surface of the extension portion 21 is a curved surface. In an exemplary embodiment, as shown in FIG. 7, the pins 22 on the extension portion 21 can be inserted in the second holes 111 of the blade root 11 such that the blade root 11 is fixedly connected to the extension portion 21.

In the embodiment as shown in FIG. 7, other structure and construction of the blade 10, the connection device 20 and the pitch bearing 30 refer to the above description, and will not be explained here.

According to some embodiments of the disclosure, as shown in FIG. 2 and FIG. 3, the extension portion 21 may be continuously provided in the circumferential direction, i.e., the extension portion 21 extends in the circumferential direction to form a ring shape. In this case, the pins 22 can be evenly or unevenly distributed in the circumferential direction. In an exemplary embodiment, the pins 22 can be disposed in the extension portion 21 along a full circumference. However, the present disclosure is not limited to this. According to some embodiments of the disclosure, the extension portion 21 can comprise a plurality of extension portion segments that are distributed in a circumferential direction and spaced from each other. A specific structure of the connection device according to an embodiment of the present disclosure will be described in detail below with reference to FIG. 8 and FIG. 9.

Figure 8:
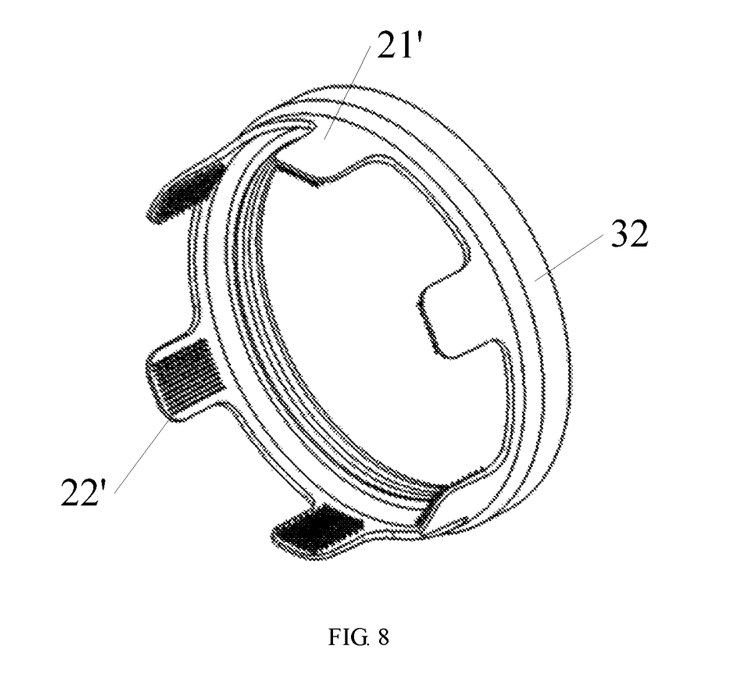
FIG. 8 is a perspective view of a connection device according to an embodiment of the present disclosure.

FIG. 8 is a perspective view of a connection device according to an embodiment of the present disclosure. As shown in FIG. 8, the connection device 20 comprises an extension portion 21 which comprises a plurality of extension portion segments 21' that are distributed in a circumferential direction and spaced from each other. In an exemplary embodiment, the plural extension portion segments 21' are arranged uniformly in the circumferential direction.

According to some embodiments of the disclosure, the connection device 20 further comprises pin(s) 22'. In an exemplary embodiment, each extension portion segment 21' comprises at least one pin 22', for example a plurality of pins 22'. In an exemplary embodiment, the extension portion segment 21' and the pins 22' are integrally formed together. In some embodiments, the extension portion segment 21' and the pins 22' can be separately formed and then connected to each other, for example through holes in the extension portion segment 21'.

In an exemplary embodiment, each extension portion segments 21' comprise a same number of pins 22'. However, the present disclosure is not limited to this. In some embodiments, the number of the pins 22' on the extension portion segments 21' may be different from each other. In this case, the number of the pins 22' on the extension portion segments 21' may be determined according to load distribution.

In the embodiment as shown in FIG. 8, other structure and construction of the blade 10, the connection device 20 and the pitch bearing 30 refer to the above description, and will not be explained here.

Figure 9:
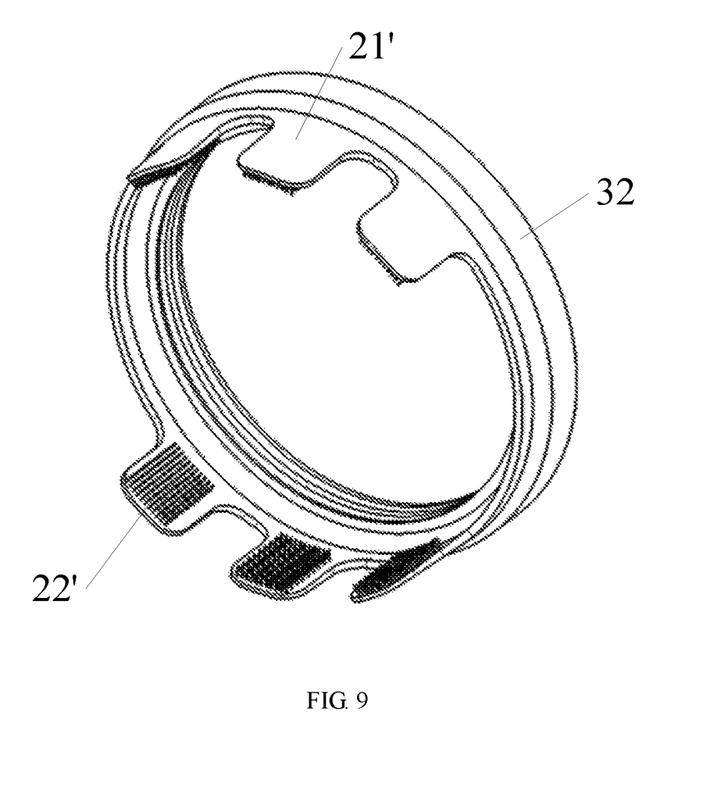
FIG. 9 is a perspective view of a connection device according to another embodiment of the present disclosure.

FIG. 9 is a perspective view of a connection device according to an embodiment of the present disclosure. FIG. 9 shows, as compared with the embodiment shown in FIG. 8, the extension portion segments 21' of the connection device 20 can be unevenly distributed in the circumferential direction. In this case, the arrangement of the extension portion segments 21' may be determined according to load distribution.

In an exemplary embodiment, each extension portion segments 21' comprise a same number of pins 22'. In some embodiments, the number of the pins 22' on the extension portion segments 21' may be different from each other.

In the embodiment as shown in FIG. 9, other structure and construction of the blade 10, the connection device 20 and the pitch bearing 30 refer to the above description, and will not be explained here.

Several methods for connecting a blade to a pitch bearing of a wind turbine according to embodiments of the present disclosure will be described below with reference to the accompanying drawing in combination with the above structures of the wind turbine.

Figure 10:
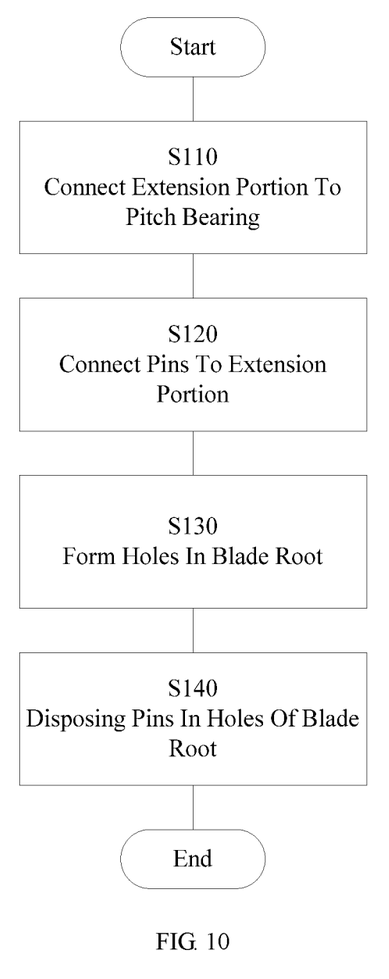
FIG. 10 is a flow diagram of a method for connecting a blade to a pitch bearing of a wind turbine according to an embodiment of the present disclosure.

FIG. 10 is a flow diagram of a method for connecting a blade to a pitch bearing of a wind turbine according to an embodiment of the present disclosure.

As shown in FIG. 10, at step S110, an extension portion 21 of a connection device 20 is provided and the extension portion 21 is connected to an inner bearing ring 31 or an outer bearing ring 32 of an pitch bearing 30. In some embodiments, the extension portion 21 may be manufactured by machining. In an exemplary embodiment, the extension portion 21 is integrally formed with the inner bearing ring 31 or the outer hearing ring 32 of the pitch bearing 30. In some embodiments, the extension portion 21 and the inner bearing ring 31 or the outer bearing ring 32 of the pitch bearing 30 can be separately formed and then connected together by for example welding.

At step S120, pin(s) 22 of the connection device 20 are provided and connected to the extension portion 21. In some embodiments, first holes 23 may be formed in the extension portion 21, and then the pins 22 are inserted in the first holes 23. In some embodiments, the pin 22 can be disposed in the first hole 23 of the extension portion 21 with interference fit. In some embodiments, the pin 22 can be integrally formed with the extension portion 21.

At step S130, a blade root 11 is provided in which second hole(s) 111 are formed. In an exemplary embodiment, the second hole 111 may be formed in the blade root 11 by for example drilling. In some embodiments, the first hole 23 of the extension portion 21 and the second hole 111 of the blade root 11 may be formed in a single process by drilling.

At step S140, the pin(s) 22 are inserted in the second hole(s) 111 of the blade root 11. In some embodiments, the pin 22 can be disposed in the second hole 111 with interference fit. In some embodiments, when the pin 22 is being disposed in the second hole 111, adhesives such as resin can be applied between the pin 22 and the second hole 111. In some embodiments, when the pin 22 is disposed in the second hole 111, the pin 22 can be fixed in the second hole 111 by for example welding, clinching and the like.

Figure 11:
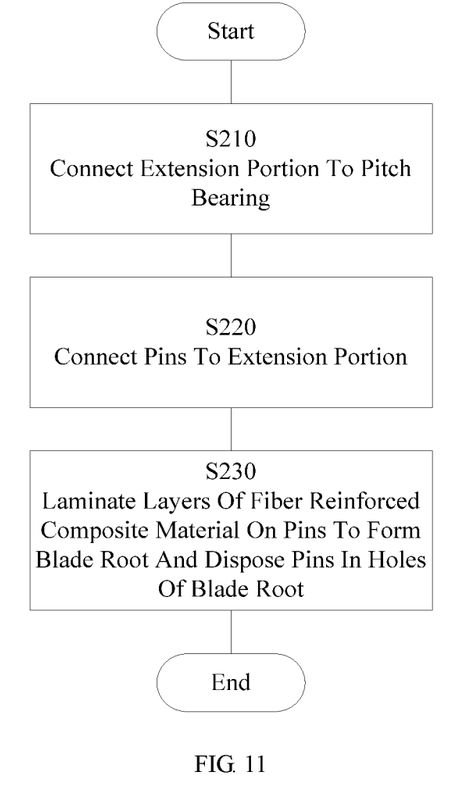
FIG. 11 is a flow diagram of a method for connecting a blade to a pitch bearing of a wind turbine according to an embodiment of the present disclosure.

FIG. 11 is a flow diagram of a method for connecting a blade to a pitch bearing of a wind turbine according to an embodiment of the present disclosure.

The procedures of steps S210-S220 of the method of FIG. 11 are similar to those of steps S110-S120 as described above with reference to FIG. 10, and thus will not be explained here.

At step S230, layers of fiber reinforced composite material are laminated on the pins 22 to form the blade root 11, such that the pins 22 are disposed in the second holes 111 of the blade root 11. In this case, the shape of the pin 22 allows to avoid damage to the fiber reinforced composite material when the pin 22 is embedded in the blade root 11. In some embodiments, after the layers of fiber reinforced composite material are laminated, the composite material is cured. In some embodiments, winding or braiding techniques might be used to place fibers over the extension portion 21 in such way that pins 11 are integrated in blade root 11 structure.

The disclosure is related to not only the above pitch bearing, blade and impeller of the wind turbine, but also related to the wind turbine mounted with at least on of the above pitch bearing, blade and impeller.

As described above, the device and method according to the disclosure can be applied in the wind turbine, especially in the blade root connections and separated blade connections. However, the present disclosure is not limited to this. It will be appreciated by any person skilled in the art that the device and method according to the disclosure can also be applied in other fields, such as aircraft, ships and the like.

Though the present disclosure is described with reference to the exemplary embodiments, it should be understood that the present disclosure is not limited to the structures and the methods of the above embodiments. Conversely, the present disclosure intends to cover various modifications and equivalent configurations. In addition, though various exemplary combinations and structures disclose various elements and method steps of the disclosure, other combinations including more or less elements or steps also fall into the scope of the present disclosure.

What is claimed is:

1. A pitch bearing of a wind turbine, configured to be connected to a blade, comprising:
    an inner bearing ring, an outer bearing ring and an extension portion, wherein one of the inner bearing ring and the outer bearing ring is connected to the extension portion; and
    wherein the pitch bearing further comprises a plurality of pins, which are configured to connect a blade root of the blade to the pitch bearing, and
    wherein the pins, the extension portion, and the one of the inner bearing ring and the outer bearing ring connected to the extension portion is a unitary one-piece element.

2. The pitch bearing according to claim 1, wherein the pins are connected to a radial outer side or a radial inner side of the extension portion.

3. The pitch bearing according to claim 1, wherein a radial thickness of the extension portion decreases in a direction away from the said one of the inner bearing ring and the outer bearing ring.

4. The pitch bearing according to claim 1, wherein the extension portion comprises a plurality of extension portion segments that are distributed in a circumferential direction and spaced from each other.

5. A blade for a wind turbine, configured to be connected to the pitch bearing according to claim 1, comprising:
    a blade root, comprising: a plurality of second holes which are provided in a radial direction of the blade root, and
    wherein the second holes are configured to allow the pins to pass through the second holes to be connected to the blade root.

6. An impeller of a wind turbine, comprising:
    a blade, comprising a blade root, comprising a plurality of second holes which are provided in a radial direction of the blade root;
    a connection device, comprising:
    an extension portion; and
    a plurality of pins; and
    a pitch bearing, comprising an inner bearing ring and an outer bearing ring, wherein one of the inner bearing ring and the outer bearing ring is connected to the extension portion,
    wherein the pins are connected to the blade root through the second holes; and
    wherein the pins, the extension portion, and the one of the inner bearing ring and the outer bearing ring connected to the extension portion is a unitary one-piece element.

7. The impeller according to claim 6, wherein the pins are connected to a radial outer side or a radial inner side of the extension portion.

8. The impeller according to claim 6, wherein a radial thickness of the extension portion decreases in a direction away from the said one of the inner bearing ring and the outer bearing ring.

9. The impeller according to claim 6, wherein the pins are disposed such that an extending direction of the pins is perpendicular to a pitch axis of the blade.

10. The impeller according to claim 6, wherein the extension portion comprises a plurality of extension portion segments that are distributed in a circumferential direction and spaced from each other, and the pins comprise a plurality of groups of pins that are distributed in the circumferential direction and spaced from each other.

11. A wind turbine, comprising:
    a pitch bearing according to claim 1.

12. A wind turbine, comprising:
    a blade according to claim 5.

13. A wind turbine, comprising:
    an impeller according to claim 6.

* * * * *